United States Patent [19]
Hüppi et al.

[11] Patent Number: 6,073,545
[45] Date of Patent: Jun. 13, 2000

[54] COOKING VESSEL FOR USE IN A COOKING INSTALLATION

[75] Inventors: Marcel Hüppi, Zuzwil; Karl Berroth, Gutenswil, both of Switzerland

[73] Assignee: Heinrich Kuhn, Rikon im Tosstal, Switzerland

[21] Appl. No.: 09/143,673

[22] Filed: Aug. 31, 1998

[30] Foreign Application Priority Data

Sep. 4, 1997 [CH] Switzerland ............... 2075/97

[51] Int. Cl.[7] ................................ A47J 27/08
[52] U.S. Cl. ................. 99/422; 99/447; 126/390
[58] Field of Search .............. 99/422, 447; 126/390, 126/373

[56] References Cited

U.S. PATENT DOCUMENTS

| | | | |
|---|---|---|---|
| 2,526,687 | 10/1950 | Reams | 126/390 |
| 4,258,695 | 3/1981 | McCarton et al. | 126/375 |
| 4,977,302 | 12/1990 | Merigaud et al. | 99/DIG. 14 |

FOREIGN PATENT DOCUMENTS 688 301 A5  7/1997  Switzerland.

*Primary Examiner*—Reginald L. Alexander
*Attorney, Agent, or Firm*—Schnader Harrison Segal & Lewis LLP; Gerard J. Weiser

[57] ABSTRACT

The cooking vessel has a bottom with a region of metallic material with incorporated ceramic parts. The aforementioned region is, for example, produced from metal-impregnated ceramic or ceramic-reinforced metal. According to one variant, the aforementioned region displays infiltrated iron for the production of induction capability. The physical properties of the bottom can be adjusted to desired values by varying the metallic material and the ceramic parts.

16 Claims, 2 Drawing Sheets

COOKING VESSEL FOR USE IN A COOKING INSTALLATION

BACKGROUND OF THE INVENTION

1. Field of the Invention

The invention pertains to a cooking vessel for use on a cooking station.

2. Description of the Related Art

Cooking vessels with a bottom and a vessel wall connected to the bottom have long been known in numerous designs. For example, Swiss Patent No. CH-A-688 301 discloses such a cooking vessel, which is designed as a steam cooking pot. It is also known that, in such vessels with a multilayered bottom, the applicability on different cooking stations is improved and the energy consumption can be reduced. Such bottoms consist, for example, of metal plates joined together, especially by means of soldering. Cooking vessels with such bottoms may also be suitable for induction heating. Although such cooking vessels have proven effective in practice, because of the structure of such bottoms on such cooking vessels of different materials, the problem exists of bottom stability as a result of the bimetal effect when heated. With respect to energy consumption or application on different cooking stations, the need exists for improving the bottom stability by optimizing the material properties, especially the coefficient of thermal expansion, the thermal conductivity, the modulus of elasticity, and the fracture resistance.

SUMMARY OF THE INVENTION

These goals are addressed with a cooking vessel by producing the bottom, at least in some regions, of a metallic material with ceramic parts incorporated in it. In a cooking vessel according to the invention, the physical properties of the bottom can be adjusted by changing the metallic material and the ceramic contents to desired values. In this way, very low coefficients of expansion and high thermal conductivity can be achieved with a simultaneously high fracture resistance. A high modulus of elasticity can be achieved by correspondingly increasing the content of ceramic. Also advantageous is the fact that the specific weight of the composite of metallic material and incorporated ceramic components may be smaller than the specific weight of the metallic material itself. An especially high conductivity can be achieved by a composite of ceramic and copper.

A substrate of metallic material and incorporated ceramic parts makes it possible to join then by soldering. This substrate can be produced as a plate and can be affixed to the bottom side, e.g., of a steel pot, by soldering. Such a bottom is characterized not only by the aforementioned advantageous material properties but is also economical and simple to produce. Such a cooking vessel can be designed directly as a steam pressure cooker.

In order to attain suitability for induction, the aforementioned metallic material may contain iron. Alternatively a plate of ferritic material can be soldered onto the aforementioned substrate.

However, the invention also makes it possible to produce a cooking vessel by pressure die-casting, in which case the aforementioned substrate comprising the metallic material and the incorporated ceramic parts is integrated in the cast metal. The bottom of the cooking vessel then consists at least in some regions of metal-impregnated ceramic. Handles, etc., can be produced in a single process as cast-on parts. Here especially aluminum or an aluminum alloy is suitable as the material. The walls of the vessel and the casting gate parts consist of this metallic material. In the bottom of the vessel then this metallic material is enriched with ceramic components.

Another advantage of the invention is seen in the fact that the bottom can be produced simply and economically on the lower side with a structure, e.g., for the formation of venting channels. Such venting channels may be necessary in order to prevent so-called "sticking" of the vessel, especially to flat cooking stations.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
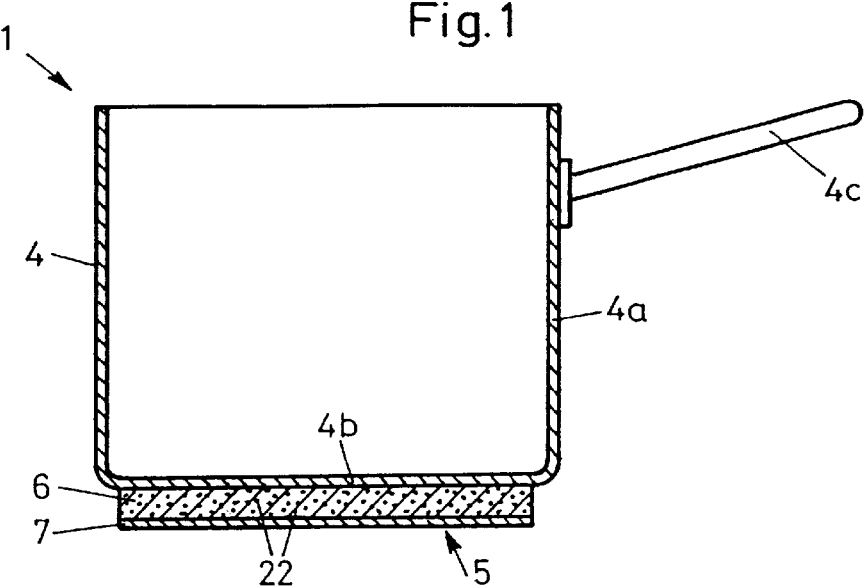
FIG. 1 shows a schematic section through a cooking vessel according to the invention.

The cooking vessel 1 shown in FIG. 1 has a pot 4, e.g., a deep-drawn steel pot which has a circumferential vessel wall 4a and a bottom wall 4b. On said pot 4 projections are formed, e.g., a handle 4c. The cooking vessel 1 may be provided with a lid, not shown here, and may be designed especially as a steam pressure cooker.

The bottom wall 4b forms with the two plates 6 and 7 joined to it a multilayered bottom 5. The plate 6 has a substrate which is produced from a metallic material with ceramic components incorporated in it. The plate 6 is joined to the bottom wall 4c, e.g., by soldering.

In the case of materials that cannot be soldered, joining by beating is possible, in which case beating is performed by known methods on the preheated body. The plate 7 may also be soldered to the plate 6. The plate 7, for example, is an austenitic or a ferromagnetic plate. This plate 7, however, may be omitted. The substrate of the plate 6 is a composite material with a metallic component of aluminum, an aluminum alloy, copper, or a copper alloy, and ceramic particles. Also conceivable, however, are other good heat-conducting metals such as iron with ceramic particles. The production of such composite materials is well known. Until now such composite materials have been used especially in electronics for the production of circuit boards. For the production of the substrate, preferably a process is used which is known as squeeze casting. In this process, a ceramic preform is inserted into a pressure die-casting apparatus and heated to an operating temperature which is lower than the melting point of the metallic material. The metallic melt is poured onto the heated preform and, e.g., pressed on the preform using a ram. Following this, the finished substrate is ejected in the usual way. This process makes it possible to produce large numbers of pieces at relatively low production costs.

The production of ceramic preforms is also well known. The preform is a porous ceramic body and may, for example, be produced by sintering or pressing. A suitable material is aluminum oxide or silicon carbide, aluminum nitride, carbon oxide and zirconium oxide, or silicon nitride. Combinations of these substances are also conceivable.

In the case of the finished substrate, the content of ceramic is preferably less than 80 vol. %. The content is preferably in the range between 20 and 50 vol. %, especially 25 and 35 vol. %.

Figure 2:
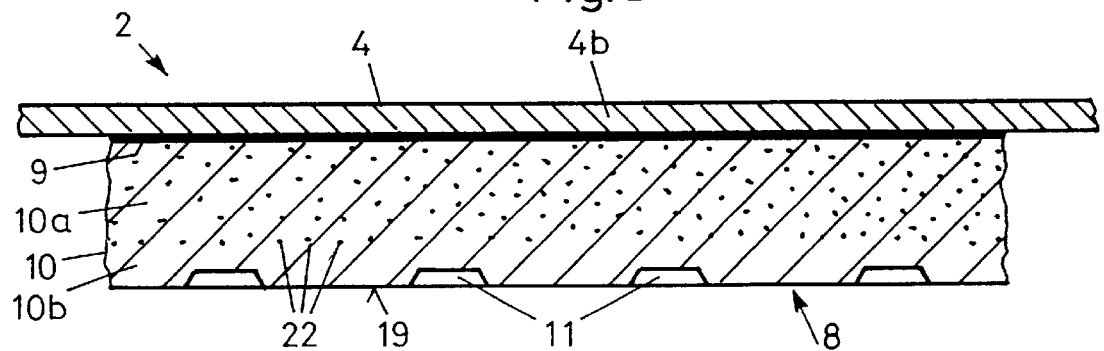
FIG. 2 shows a section through the bottom of a cooking vessel according to one variant.

The cooking vessel 2 shown in FIG. 2 differs from that in FIG. 1 in the bottom 8. The latter displays a plate 10 which is connected to the pot 4 by a soldered layer 9. The connection between the plate 10 and the pot 4 can also be produced by a conventional beating process. The plate 10 has an upper region 10a and a lower region 10b. The region 10a has a content of ceramic material 22 shown here as a dotted line. On the other hand, the region 10b consists predominantly of metallic material, e.g., aluminum or an aluminum alloy. The bottom side 19 of the plate 10 is not flat but rather is structured and has channels 11 which extend from the center to the edge of the bottom and form venting channels. The bottom side 19 may also be provided with concentric rings to reduce stresses in the case of differential thermal expansion. The purpose of these channels 11 is described above. For production of the plate 10 a preform is used which corresponds to the region 10a. The casting mold is so designed that on the one hand the metallic material infiltrates the preform, and on the other hand, the region 10b is constructed with the above-described structure on it. Such a plate 10 can therefore be produced very simply and economically in one operating step.

Figure 3:
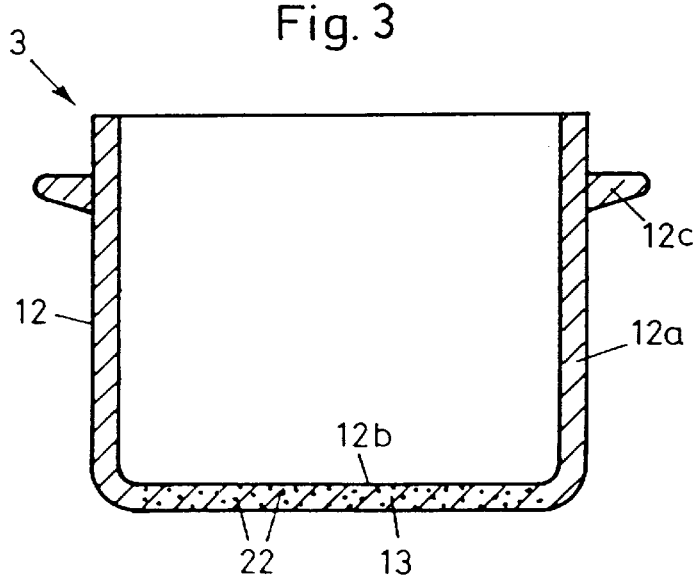
FIG. 3 shows a schematic section through a cooking vessel according to another variant.
Figure 4:
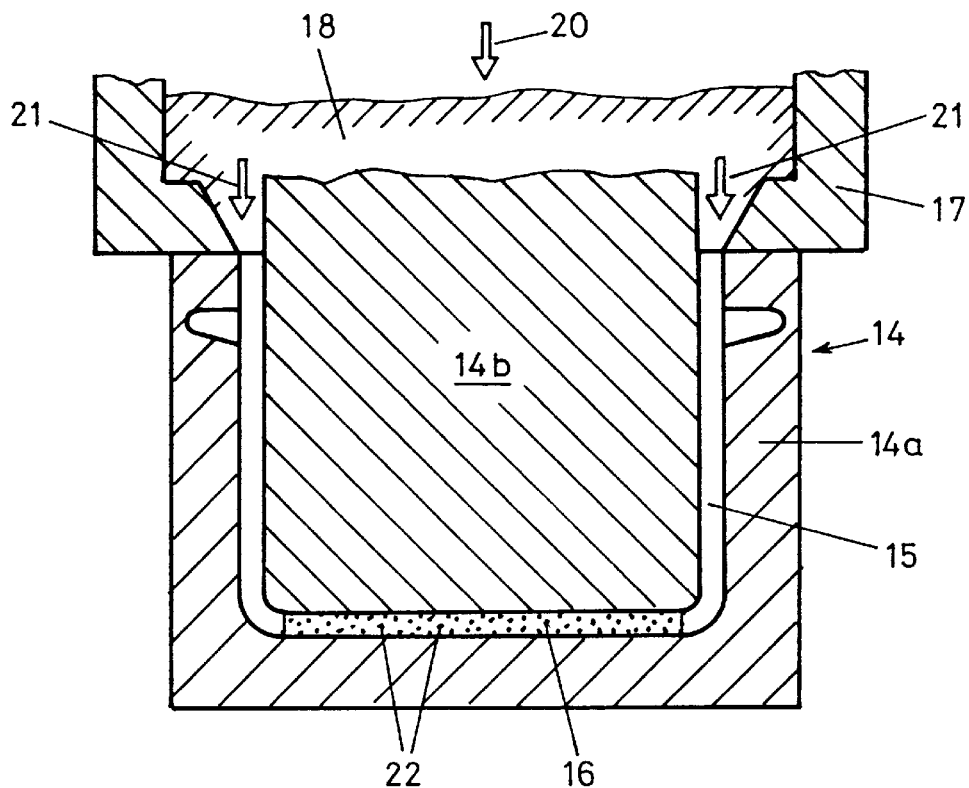
FIGS. 4 and 5 show schematically the production of the cooking vessel in FIG. 3.
Figure 5:
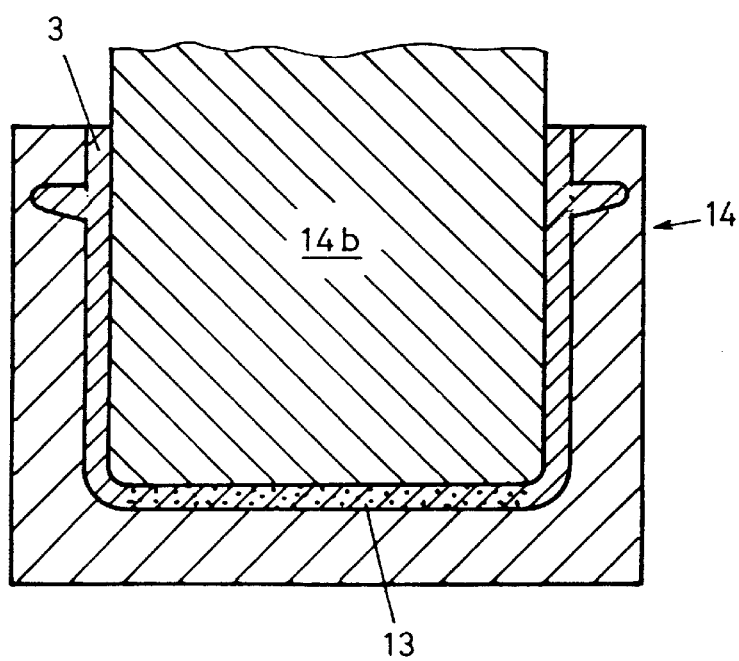

FIG. 3 shows a cooking vessel 3 which is produced by pressure die-casting, e.g., by aluminum pressure die-casting. In this case, handles 12c or the like are formed on the wall 12a of the pot 12. In the bottom 12b, a bottom region 13 is integrated which is produced from the aforementioned substrate, thus a metallic material with incorporated ceramic parts 22. The ceramic parts 22 are indicated schematically by the dotted region. The cooking vessel 3 can be produced, e.g., as shown in FIGS. 4 and 5. The casting device shown schematically here consists of an outer die part 14a and an inner die part 14b as well as a reservoir 17. FIG. 4 shows the preform 16 of porous ceramic inserted. The reservoir 17 contains the metallic material 18, thus aluminum or an aluminum alloy. Between the two die parts 14a and 14b is an intermediate space 15 corresponding to the cooking vessel 3 to be produced. In order to introduce the metallic material 18 into the intervening space 15, the latter is evacuated and pressure is exerted on the material 18 in the direction of the arrow 20. This material 18 now passes in the direction of the arrow 21 into the intermediate space 15 and simultaneously also into the pores of the preform 16. The preform 16 is thus impregnated with metallic material 18. FIG. 5 shows the finished cooking vessel 3 ready for ejection. The essential physical properties of the cooking vessel 3 may, as mentioned above, be adjusted within a broad range through the choice of the metallic material, the ceramic and the contents of these components. By the aforementioned procedure the bottom is securely integrated into the vessel without difficult-to-clean steps or grooves. Additional means for attachment of the bottom 13 are therefore unnecessary.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A cooking vessel for use on a cooking station, the cooking vessel comprising a bottom and a vessel wall connected to the bottom, wherein the bottom has a region comprising a metallic material integral with ceramic parts incorporated therein.

2. The cooking vessel of claim 1, wherein the bottom comprises a bottom wall and the region is a plate joinably connected to the bottom wall by a connection.

3. The cooking vessel of claim 2, wherein the plate is joined to the bottom wall by a solder connection.

4. The cooking vessel of claim 2, wherein the plate joined to the bottom wall by a beaten connection.

5. The cooking vessel of claim 1, wherein the region comprises a metal-impregnated ceramic.

6. The cooking vessel of claim 1, wherein the region comprises a ceramic-reinforced metal.

7. The cooking vessel of claim 1, wherein the metallic material is one of aluminum, an aluminum alloy, copper, a copper alloy, iron, an iron alloy, and combinations thereof.

8. The cooking vessel of claim 1, wherein the metallic material is a ferromagnetic material.

9. The cooking vessel of claim 1, wherein a plate of ferritic or austenitic material is soldered or beaten onto the region.

10. The cooking vessel of claim 1, wherein the region comprises about 20% to about 80% ceramic by volume.

11. The cooking vessel of claim 1, wherein the region comprises about 20% to about 50% ceramic by volume.

12. The cooking vessel of claim 1, wherein the region comprises about 25% to about 35% ceramic by volume.

13. The cooking vessel of claim 1, wherein the cooking vessel is a fast cooker or a steam pressure cooker.

14. The cooking vessel of claim 1, wherein the bottom is structured on its bottom side to form venting channels.

15. The cooking vessel of claim 1, wherein:

the bottom comprises a bottom wall and the region is a plate joinably connected by a soldered or beaten connection to the bottom wall;

the region comprises a metal-impregnated ceramic or a ceramic-reinforced metal;

the bottom has a region integral with ceramic parts incorporated therein;

the metallic material is a ferromagnetic material and is one of aluminum, an aluminum alloy, copper, a copper alloy, iron, an iron alloy, and combinations thereof;

a plate of ferritic or austenitic material is joinably soldered or beaten onto the region;

the region comprises about 25% to about 35% ceramic by volume;

the cooking vessel is fast cooker or a steam pressure cooker; and the bottom is structured on its bottom side to form venting channels.

16. The cooking vessel of claim 15, wherein the vessel is a deep drawn pot.

* * * * *